R. H. CARSON.
FLUID TRANSMISSION AND CLUTCH MECHANISM.
APPLICATION FILED JUNE 27, 1918.
1,374,985.
Patented Apr. 19, 1921.
2 SHEETS—SHEET 1.
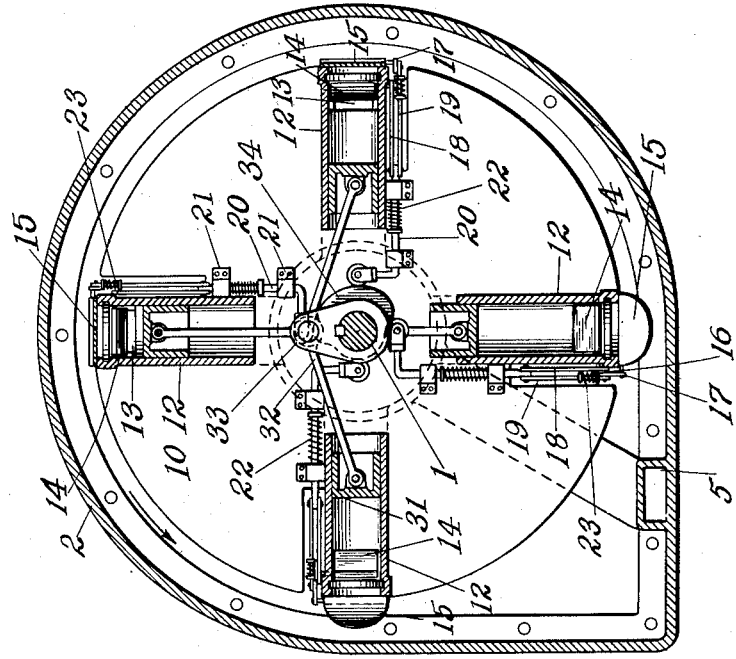
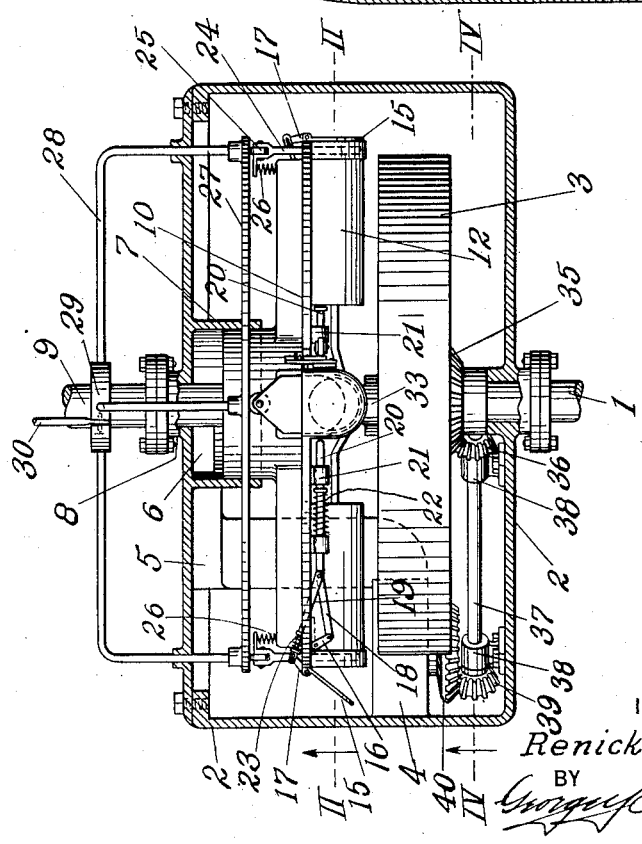
INVENTOR
Renick H. Carson
BY
ATTORNEY

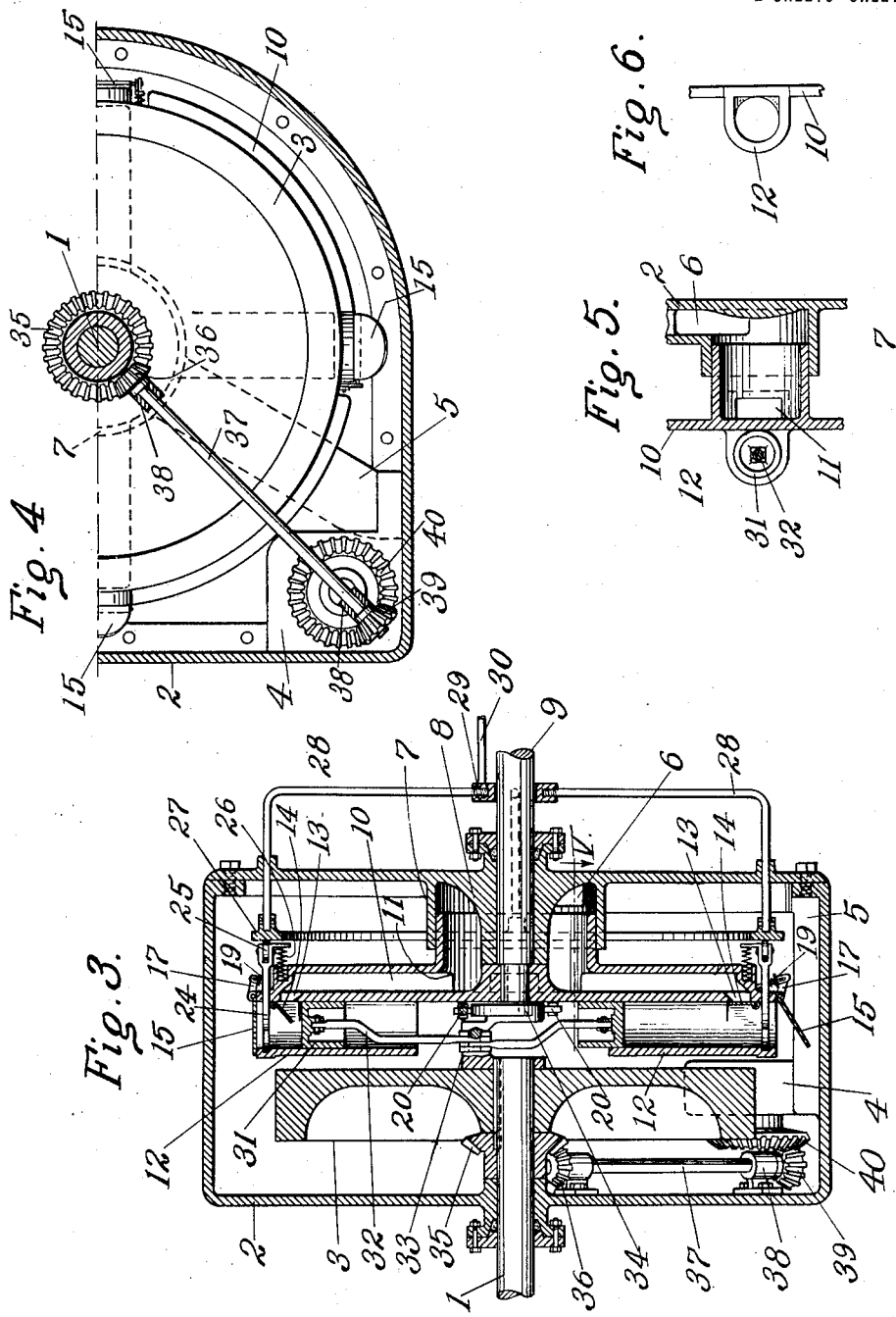

UNITED STATES PATENT OFFICE.

RENICK H. CARSON, OF KANSAS CITY, MISSOURI; ESSIE C. CARSON ADMINISTRATRIX OF SAID RENICK H. CARSON, DECEASED.

FLUID TRANSMISSION AND CLUTCH MECHANISM.

1,374,985.          Specification of Letters Patent.     Patented Apr. 19, 1921.

Application filed June 27, 1918. Serial No. 242,199.

*To all whom it may concern:*

Be it known that I, RENICK H. CARSON, a citizen of the United States, residing at Kansas City, in the county of Jackson and State of Missouri, have invented certain new and useful Improvements in Fluid Transmission and Clutch Mechanism, of which the following is a specification.

This invention relates to combined fluid transmission and clutch mechanism for motors, and more especially for internal combustion engines for motor cars, and has for its object to produce mechanism which is positive and reliable in action, and by which the driver of the car can operate the transmission shaft at any speed desired up to that of the engine shaft, and by "killing" the engine, utilize the same as a drag to check the speed of travel.

A further object is to produce a transmission for utilizing lubricating fluid not only as a lubricating medium but as a means of controlling the speed of travel; as a positive clutch for securing maximum speed of rotation for the transmission shaft, and for utilizing the engine as a drag for checking the speed of travel.

Another object is to utilize the power of the engine for circulating the lubricating fluid for lubrication purposes and for positioning it for instant use for power transmission and speed reducing purposes.

With these general objects in view the invention consists in certain novel and useful features of construction and combinations of parts as hereinafter described and claimed; and in order that it may be fully understood, reference is to be had to the accompanying drawings, in which:

Figure 1, is a plan view of an engine shaft equipped with a fly wheel and combined clutch and transmission mechanism embodying the invention, and also shows a housing for said parts in horizontal section.

Fig. 2, is a vertical section taken on the line II—II of Fig. 1.

Fig. 3, is a central vertical section taken at right angles to the section shown by Fig. 2.

Fig. 4, is a fragmentary vertical section taken on the line IV—IV of Fig. 1.

Fig. 5, is a section taken on the dotted line V of Fig. 3.

Fig. 6, is an outer end view of one of the cylinders of the apparatus.

Referring to the drawings in detail where like reference characters are applied to corresponding parts, 1 indicates the shaft of an internal combustion engine, and 2 a housing for the fly wheel 3 upon said shaft.

Suitably secured with the housing is a centrifugal pump 4 of any approved type provided with a pressure regulating valve (not shown,) and said pump is connected by a passage 5 to an opening 6 in a hollow cylindrical hub or flange 7 projecting inwardly from the rear wall of the housing. The same wall of the housing is provided with a hub 8 forming the bearing for one end of transmission shaft 9 for effecting operation of the differential, not shown, of the car.

Mounted upon the end of the shaft 9 within the housing is a rotary device or wheel 10, the same being preferably formed with radial passages communicating at their inner ends with a hollow hub 11 journaled within the flange 7 but of such proportion as to avoid closing the opening 6 in the flange 7, so that oil driven by said pump through passage 5, may have free access to the interior of the wheel 10.

The wheel is formed with or carries a series of radially arranged cylinders 12 and in each near its outer end, is an oil-supply port 13 communicating with the wheel 10, a swing valve 14 normally closing said port.

The outer end of each cylinder is equipped with a pivoted valve 15, the pivots of the two valves for each cylinder being respectively provided with crank arms 16 and 17, pivotally connected by respective links 18 and 19 to a slide rod 20 mounted in guides 21 on the hollow wheel and when unresisted, held pressed inward by spring 22 so as to hold valve 14 yieldingly closed and valve 15 yieldingly opened, it being noted that the connection between each rod 20 and its corresponding valve 15 has play normally taken up by a spring 23, so that the valves 14 and 15 may properly function without interfering with each other.

Each cylinder between the valves 14 and 15 thereof, is provided with a slide valve 24 equipped at the end of its stem with a roller 25 held normally pressed by spring 26 against a movable frame 27 secured upon the arms 28 of a slidable collar 29 encircling shaft 9 and adapted to be slid upon the latter by means of a manually controlled rod 30.

Each cylinder is equipped with a piston 31 which moves outward to the respective port 13 of such cylinder, and each piston is pivotally connected by connecting rod 32 to a crank 33 of shaft 1, it being noted by reference to Fig. 3 that the cam 34 for engagement with the valve operating rods 20, is integrally or otherwise rigidly formed with shaft 1. It will also be seen that to operate the pump mentioned, a bevel gear 35 is mounted on shaft 1 and meshes with a bevel gear 36 on a shaft 37 journaled in suitable bearing brackets 38, and said shaft is equipped with a bevel pinion 39 intergeared with a larger bevel gear 40 forming a part of the pump.

From the foregoing it will be seen that when the engine is operating, it will set up and maintain a continuous circulation of oil with which the housing is charged to a considerable depth, not shown.

When the valves 24 are fully open, the oil circulates freely without effecting turning movement of the hollow wheel and shaft 9, the fact that one or two of the valves 15 are closed part of each revolution of shaft 1 through the action of the cam 34 on the rods 20, having no effect on the position of the wheel 10 and shaft 9 because the pistons of the cylinders related to the said valve or valves 15, are moving inward at that time and, therefore, are charging such cylinder or cylinders with oil.

When the valves 24 which close or open in unison, are closed sufficiently to offer greater resistance to the free circulation of oil than is offered by the rear wheels, not shown, of the car, as assumed by the showing of Figs. 2 and 3, it will be seen that the rotation of the crank 33 and cam 34 in the direction indicated by the arrow Fig. 2, will advance the pistons of the left-hand and bottom cylinders and withdraw the pistons of the other cylinders, it being noted at this time that the valves 14 and 15 of the first-named cylinders are in closed and opened positions respectively and that the corresponding valves of the other cylinders are opened and closed respectively. It will thus be seen that the advancing pistons mentioned are acting as impellers because the oil in their respective cylinders offers sufficient resistance to overcome the tractional resistance of the wheels of the car and because of this fact wheel 10 and the shaft 9 will be turned in the same direction as shaft 1 but at a slower speed, the speed of the wheel and shaft 9 being increased or diminished accordingly as the valves 24 offer more or less obstruction to the expulsion of the oil from the ends of the cylinders containing the advancing pistons, it being obvious that should the valves 24 be completely closed the oil in the cylinders will prevent the advance of the pistons of such cylinders and hence effect a rigid interlocking relation between the two shafts so that shaft 9 shall be rotated at the same speed as the driving shaft 1.

In Fig. 2 it will be noticed that the relation between the crank arm 33 and cam 34 is such that the latter effects the adjustment of the valves 14 and 15 hereinbefore explained, and that the proportion of cam 34 is such that the said valves 14 and 15 of each cylinder are in closed and opened position respectively for something less than half a revolution of the cam and that consequently each piston is utilized in each revolution to act as an impeller for wheel 10 and shaft 9 for nearly a half revolution of shaft 1, and that where four cylinders and pistons are employed a second piston begins to apply force to rotate wheel 10 and shaft 9 before the companion active piston ceases its impelling action. It will thus be seen that when the discharge or open ends of the cylinders are partly or wholly obstructed the impelling force on wheel 10 and shaft 9 is continuous, and that such force is never absent except when the valves 24 are fully open. It will also be noticed that immediately after a rod 20 passes out of the influence of the cam, that is when the enlarged portion of the cam passes beyond the roller of the rod, the spring 22 of such rod immediately reverses the positions of its connected swing valves 14 and 15, that is to say it closes valve 14 and opens valve 15, the position of the crank being such that as this occurs the piston of the corresponding cylinder begins to act as an impeller. It will also be noticed that as the enlarged portion of the cam forces a rod 20 outward and opens valve 14 and closes valve 15, the position of the crank is such that the piston of the corresponding cylinder is moved inward and hence it produces a suction which tends to charge such cylinder with oil. If the parts are accurately made the inward movements of the pistons should produce sufficient suction to charge the cylinders with oil without the assistance of the pump provided the level of the oil was above the highest point of the opening 6, but as it would be difficult to make the connections sufficiently air tight to accomplish this purpose, it is preferred to employ a centrifugal pump or the like for forcing the oil up through the passages in the wheel 10 and into the cylinders at the proper times, as the use of the pump would make the circulation of the oil more positive and it would not be necessary to charge the housing to a greater depth than necessary to cover the intake openings, not shown of the pump.

From the foregoing it will be apparent that by closing the valves 24 gradually, power can be transmitted from shaft 1 to shaft 9 to start the car gently and without objectionable jumps or jerks so common in cars equipped with the ordinary power transmission gearing, the speed of rotation of the differential shaft being gradually increased by the gradual advance of said valves, and attaining the maximum speed when the circulation of the oil is arrested by the complete closure of said valves.

The transmission mechanism described can be utilized to perform a braking function by throttling down the engine or throwing it out of operation when the car is descending a grade. If this is done when the valves are closed, the rotation of shaft 9 will through the action of the pistons on the fluid in the cylinders, rotate the engine shaft and this in turn will operate the engine pistons and compel the same to successively make their compression stroke, and thereby impose such resistance to the rotation of shaft 9 that the speed of the same will be retarded, that is to say the engine will act as a drag on the coasting speed of the car. If the engine under such conditions offers excessive resistance the valves 24 may be partly opened so that the engine shaft shall be turned at a slower speed than that at which the transmission shaft 9 rotates, in the same manner that the engine shaft drives the transmission shaft at a reduced speed when the valves are partly opened.

From the above description it will be apparent that I have produced a combined fluid transmission and clutch which embodies the features of advantage enumerated as desirable in the statement of the object of the invention, and while I have illustrated and described the preferred embodiment of the same, it will be obvious that changes may be made without departing from the principle of construction and operation involved or from the spirit and scope of the appended claims.

I claim:

1. A combined fluid transmission and clutch, comprising a housing, a driving shaft projecting therein, a series of cylinders rotatable together around the same axis as said shaft and having intake ports intermediate their ends for receiving fluid from the housing, manually-controlled valves for said cylinders outward of said ports, valves for said ports, reciprocating pistons in said cylinders actuated by said drive shaft and adapted when moving outward to force fluid through the outer ends of the cylinders when said manually-controlled valves are open and against said valves when the same are partly or wholly closed, and means for closing the port-controlling valves as the pistons move outward and for opening said valves as the pistons move inward.

2. A combined fluid transmission and clutch, comprising a housing, a driving shaft projecting therein, a series of cylinders rotatable together around the same axis as said shaft and having intake ports intermediate their ends for receiving fluid from the housing, manually-controlled valves for said cylinders outward of said ports, valves for said ports, reciprocating pistons in said cylinders actuated by said driving shaft and adapted when moving outward to force fluid through the outer ends of the cylinders when said manually-controlled valves are open and against said valves when the same are partly or wholly closed, means for closing the port-controlling valves as the pistons move inward, and means for forcing fluid through said ports into the cylinders when said pistons are moving inward.

3. A combined fluid transmission and clutch, comprising a housing, a driving shaft projecting therein, a series of cylinders rotatable together around the same axis as said shaft and having intake ports intermediate their ends for receiving fluid from the housing, manually-controlled valves for said cylinders outward of said ports, valves for said ports, reciprocating pistons in said cylinders actuated by said drive shaft and adapted when moving outward to force fluid through the outer ends of the cylinders when said manually-controlled valves are open and against said valves when the same are partly or wholly closed, means for closing the port-controlling valves as the pistons move outward and for opening said valves as the pistons move inward, and automatic valves for closing the outer ends of the cylinders when the port-controlling valves are opened and opening the outer ends of said cylinders when the port-controlling valves are closed.

4. A combined fluid transmission and clutch, comprising a housing, a driving shaft projecting therein, a series of cylinders rotatable together around the same axis as said shaft and having intake ports intermediate their ends for receiving fluid from the housing, manually-controlled valves for said cylinders outward of said ports, valves for said ports, reciprocating pistons in said cylinders actuated by said drive shaft and adapted when moving outward to force fluid through the outer ends of the cylinders when said manually-controlled valves are open and against said valves when the same are partly or wholly closed, means for closing the port-controlling valves as the pistons move outward and for opening said valves as the pistons move inward, automatic valves for closing the outer ends of the cylinders when the port-controlling valves are opened and opening the outer ends of said cylinders when the port-controlling valves are closed, and means for forcing fluid into said cylinders through said ports when the controlling valves thereof are opened and the pistons of the corresponding cylinders are moving inward.

5. A combined fluid transmission and clutch, comprising a housing, a driving shaft projecting therein, a series of cylinders rotatable together around the same axis as said shaft and having intake ports intermediate their ends for receiving fluid from the housing, manually-controlled valves for said cylinders outward of said ports, valves for said ports, reciprocating pistons in said cylinders actuated by said drive shaft and adapted when moving outward to force fluid through the outer ends of the cylinders when said manually-controlled valves are open and against said valves when the same are partly or wholly closed, and a pump actuated from the drive shaft for continually circulating fluid from the housing into the said cylinders as the ports thereof are uncovered by their respective valves.

6. A combined fluid transmission and clutch, comprising a housing having a fluid passage, a hollow wheel in communication with the discharge end of said passage, a transmission shaft rotatable with said wheel, a series of cylinders rotatable with said wheel and provided with ports communicating with the interior of the wheel, manually-controlled valves for said cylinders outward of said ports, valves for said ports, a drive shaft projecting into the housing, reciprocating pistons in said cylinders actuated by said drive shaft, means for closing said port controlling valves when the pistons are moving outward in the cylinders, means for opening said valves when the pistons are moving inward in said cylinders, and automatic valves for closing the outer ends of the cylinders when the port controlling valves are open and for opening when the port controlling valves are closed.

7. A combined fluid transmission and clutch, comprising a housing having a fluid passage, a hollow wheel in communication with the discharge end of said passage, a transmission shaft rotatable with said wheel, a series of cylinders rotatable with said wheel and provided with ports communicating with the interior of the wheel, manually-controlled valves for said cylinders outward of said ports, valves for said ports, a drive shaft projecting into the housing, reciprocating pistons in said cylinders actuated by said drive shaft, means for closing said port controlling valves when the pistons are moving outward in the cylinders, means for opening said valves when the pistons are moving inward in said cylinders, automatic valves for closing the outer ends of the cylinders when the port controlling valves are open and for opening when the port controlling valves are closed, and pumping means actuated by the drive shaft, to circulate liquid from the housing through said passage and into said wheel and from the latter into the cylinders as their respective port controlling valves are opened.

8. A combined fluid transmission and clutch, comprising a housing having a fluid passage, a drive shaft projecting into the housing, a second shaft journaled in the housing in alinement with the drive shaft, a wheel rotatable with said second shaft and communicating centrally with the discharge end of said passage, a plurality of radially arranged cylinders carried by and provided with ports communicating with the interior of said wheel, valves for said ports, valves for the outer ends of the cylinders, spring actuated means carried by the wheel, connections between said means and the valves of said cylinders whereby inward movement of said means shall effect the closure of said port controlling valves and the opening of the other valves, a crank and a cam rotatable with the drive shaft, pistons in said cylinders, connecting rods between the pistons and said crank; said cam being adapted to successively repress said spring actuated means to open the port controlling valves and close the companion valves of the said cylinders when the pistons are moving inward, and manually controlled valves for partially or wholly closing the cylinders outward of said port controlling valves.

9. A combined fluid transmission and clutch, comprising a housing having a fluid passage, a drive shaft projecting into the housing, a second shaft journaled in the housing in alinement with the drive shaft, a wheel rotatable with said second shaft and communicating centrally with the discharge end of said passage, a plurality of radially arranged cylinders carried by and provided with ports communicating with the interior of the wheel, valves for said ports, valves for the outer ends of the cylinders, spring actuated means carried by the wheel, connections between said means and the valves of the cylinders whereby inward movement of said means shall effect the closure of said port controlling valves and the opening of the other valves, a crank and a cam rotatable with the drive shaft, pistons in said cylinders, connecting rods between the pistons and said crank; said cam being adapted to successively repress said spring actuated means to open the port controlling valves and close the companion valves of the said cylinders when the pistons are moving inward, slide valves for closing or opening the cylinders outward of said ports, yielding means for effecting opening movement of said slide valves, a frame engaging said valves, and manually controlled means for adjusting said frame to close said valves or to permit said yielding means to open them.

In testimony whereof I affix my signature.

RENICK H. CARSON.